United States Patent
Li

(10) Patent No.: US 11,374,903 B1
(45) Date of Patent: Jun. 28, 2022

(54) SYSTEMS AND METHODS FOR MANAGING DEVICES

(71) Applicant: Symantec Corporation, Mountain View, CA (US)

(72) Inventor: Qing Li, Cupertino, CA (US)

(73) Assignee: NortonLifeLock Inc., Tempe, AZ (US)

(*) Notice: Subject to any disclaimer, the term of this patent is extended or adjusted under 35 U.S.C. 154(b) by 602 days.

(21) Appl. No.: 16/262,252

(22) Filed: Jan. 30, 2019

(51) Int. Cl.
*H04L 21/00* (2006.01)
*H04L 9/40* (2022.01)

(52) U.S. Cl.
CPC ........ *H04L 63/0227* (2013.01); *H04L 63/029* (2013.01); *H04L 63/0272* (2013.01); *H04L 63/20* (2013.01)

(58) Field of Classification Search
CPC . H04L 63/0227; H04L 63/20; H04L 63/0272; H04L 63/029; H04L 29/06578; H04L 29/06986; H04L 63/0254; G06F 21/10
See application file for complete search history.

(56) References Cited

U.S. PATENT DOCUMENTS

| | | | |
|---|---|---|---|
| 2014/0026179 A1* | 1/2014 | Devarajan | G06F 21/56 726/1 |
| 2015/0012998 A1* | 1/2015 | Nellikar | H04L 63/0245 726/13 |
| 2019/0140895 A1* | 5/2019 | Ennis, Jr | H04L 41/0893 |
| 2019/0312909 A1* | 10/2019 | Kulkarni | H04L 41/0893 |

* cited by examiner

*Primary Examiner* — Jeffrey C Pwu
*Assistant Examiner* — Helai Salehi
(74) *Attorney, Agent, or Firm* — FisherBroyles, LLP

(57) ABSTRACT

The disclosed computer-implemented method for managing devices may include (i) intercepting outbound network traffic that is directed to an original target network destination, and (ii) redirecting the outbound network traffic to a virtual computing node within a publicly available on-demand cloud computing platform for the virtual computing node to apply a management policy to the outbound network traffic prior to the outbound network traffic arriving at the original target network destination, where a management service directs the performance of both configuring the computing device to redirect the outbound network traffic to the virtual computing node within the publicly available on-demand cloud computing platform and configuring the virtual computing node within the publicly available on-demand cloud computing platform to apply the management policy. Various other methods, systems, and computer-readable media are also disclosed.

20 Claims, 8 Drawing Sheets

SYSTEMS AND METHODS FOR MANAGING DEVICES

BACKGROUND

Typical security software, such as virus scanners, may not be able to execute on an Internet-of-things device due to operating system incompatibility, lack of computing resources, or excess power consumption. Some security vendors provide endpoint protection products that execute on the MICROSOFT WINDOWS operating system and/or the APPLE OSX operating system, but not necessarily on LINUX systems. The majority of small Internet-of-things devices are built on versions of the LINUX operating system, with lower power central processing units on a relatively small piece of circuitry. Central processing unit intensive features, such as application traffic prioritization, will generate excessive heat on these small Internet-of-things devices. Frequently, with additional features such as application classification running in parallel, the central processing unit is simply not powerful enough to execute these functions.

In view of the above, today in the marketplace the common way of providing a comprehensive security solution for homes, especially for protecting Internet-of-things devices in these homes, is by building the security solutions directly into customized Wi-Fi routers. One illustrative example of such a customized Wi-Fi router is the NORTON CORE by SYMANTEC. Depending on the specifics of a particular vendor's solution, the customized security-centric Wi-Fi router may connect to a vendor specific cloud solution for additional features, such as cloud-based device management.

There are a number of challenges present in the customized security Wi-Fi router approach described above. First, incorporating complex security functions into a consumer-grade Wi-Fi router can increase the hardware cost significantly. Secondly, in addition to the hardware cost, the security functions may be limited and may not be extensible. Thirdly, the quality of the security protection may be vendor specific such that there is no uniformity. Oftentimes the security features originate from a third-tier small security company, rather than originating from a leading company in the security industry. Fourthly, the customer may be locked into a specific security vendor's cloud solution. Lastly, but not least, a customized security Wi-Fi router introduces another piece of hardware into the home and causes Wi-Fi network conflicts with other devices that may be present, such as a default Wi-Fi router provided by a corresponding Internet service provider. The instant disclosure, therefore, identifies and addresses a need for improved systems and methods for managing devices.

SUMMARY

As will be described in greater detail below, the instant disclosure describes various systems and methods for managing devices. In one example, a computer-implemented method for managing devices may include (i) intercepting outbound network traffic that is directed to an original target network destination and (ii) redirecting the outbound network traffic to a virtual computing node within a publicly available on-demand cloud computing platform for the virtual computing node to apply a management policy to the outbound network traffic prior to the outbound network traffic arriving at the original target network destination. In these examples, a management service may direct both configuring the computing device to redirect the outbound network traffic to the virtual computing node within the publicly available on-demand cloud computing platform and configuring the virtual computing node within the publicly available on-demand cloud computing platform to apply the management policy.

In one embodiment, the publicly available on-demand cloud computing platform provides to subscribers mass virtual computing resources for generic computing processing. In one embodiment, the management service is distinct and independent from the publicly available on-demand cloud computing platform. In one embodiment, the computing device may include a network gateway. In one embodiment, the network gateway may include a home wireless local area network router.

In one embodiment, the network gateway substantially lacks security-specialized application processing, as distinct from generic network traffic routing processing, other than redirecting the outbound network traffic, such that the network gateway substantially offloads security-specialized application processing onto the virtual computing node within the publicly available on-demand cloud computing platform without performing the security-specialized application processing locally at the network gateway.

In one embodiment, the management policy may include a security policy. In one embodiment, the security policy is directed to (i) network traffic inspection and scanning, (ii) media content filtering, (iii) application identification and threat analysis, (iv) data loss prevention, (v) command-and-control malware detection, (vi) botnet participation detection, and/or (vii) parental control. In one embodiment, the management policy is directed to (i) quality of service management, (ii) network traffic rate control, (iii) application traffic prioritization, (iv) network traffic pausing functionality, and/or (v) problem network traffic probing and detection. In one embodiment, the computer-implemented method may further include (i) receiving inbound network traffic from the publicly available on-demand cloud computing platform that is responsive to the intercepted outbound network traffic and (ii) forwarding the inbound network traffic to a user device that generated the outbound network traffic such that the publicly available on-demand cloud computing platform acts as an intermediary to apply the management policy.

In further embodiments, the computing device may include a mobile device that operates on a cellular network. Additionally, in some examples a traffic path through the publicly available on-demand cloud computing platform is fully controlled such that traffic flows symmetrically in both directions.

Moreover, in further examples, the management policy may include a security policy. In these examples, the security policy may be configured to detect at least one network security threat. Moreover, in these examples, the security policy may be further configured to issue a real-time notification regarding the network security threat to a user account protected by the security policy through at least one of an intra-application notification, a text message notification, or a telephone notification. Moreover, in some examples, the user account protected by the management policy may apply the management policy in real-time.

In one embodiment, a system for implementing the above-described method may include (i) an interception module, stored in memory, that intercepts outbound network traffic that is directed to an original target network destination and (ii) a redirection module, stored in memory of a computing device, that redirects the outbound network traffic to a virtual computing node within a publicly available on-demand cloud computing platform for the virtual computing node to apply a management policy to the outbound network traffic prior to the outbound network traffic arriving at the original target network destination. In these examples, a management service may direct the performance of both configuring the computing device to redirect the outbound network traffic to the virtual computing node within the publicly available on-demand cloud computing platform and configuring the virtual computing node within the publicly available on-demand cloud computing platform to apply the management policy. Moreover, in these examples, the system may further include at least one physical processor configured to execute the interception module and the redirection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) intercept outbound network traffic that is directed to an original target network destination and (ii) redirect the outbound network traffic to a virtual computing node within a publicly available on-demand cloud computing platform for the virtual computing node to apply a management policy to the outbound network traffic prior to the outbound network traffic arriving at the original target network destination. In these examples, a management service may direct the performance of both configuring the computing device to redirect the outbound network traffic to the virtual computing node within the publicly available on-demand cloud computing platform and configuring the virtual computing node within the publicly available on-demand cloud computing platform to apply the management policy.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
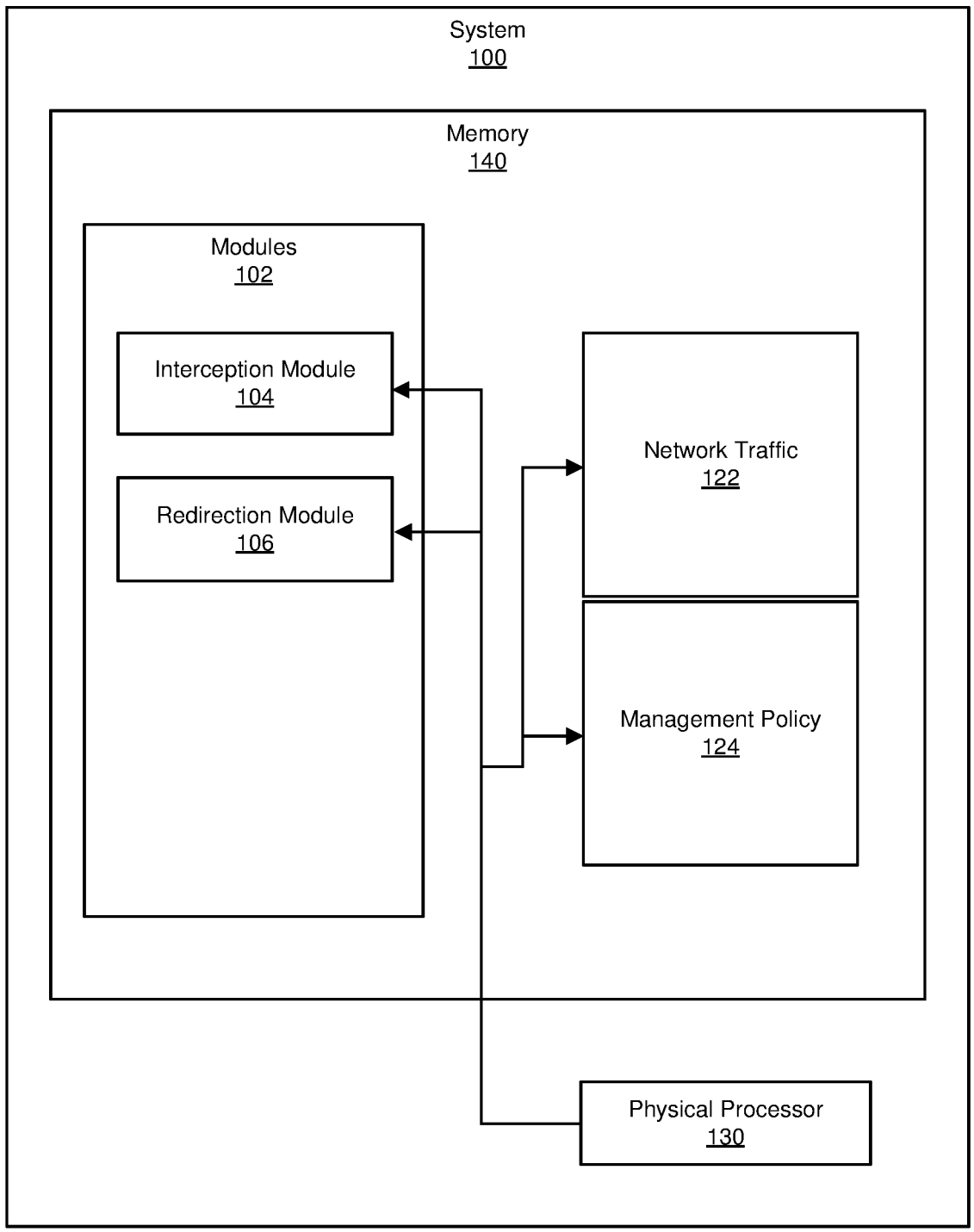
FIG. 1 is a block diagram of an example system for managing devices.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing devices. The disclosed subject matter may improve upon related systems by enabling third-party security vendors, such as SYMANTEC, to provide comprehensive and fine-grained security solutions for home networking environments without the additional cost and complexity associated with security-specific home routers. The disclosed subject matter may provide these improvements upon related systems by effectively offloading some or all of the security or network management application processing from the home network gateway onto one or more virtual machines executing within an on-demand publicly available cloud computing platform. Accordingly, the disclosed subject matter may effectively limit the modifications or configuration steps at the home network gateway to those steps that are involved in redirecting traffic to the cloud computing platform. In this manner, the disclosed subject matter may effectively provide comprehensive and fine-grained security management solutions at the point of the home network gateway, or other user computing device, such as a user mobile device, using the off-the-shelf firmware and configuration of a standard network gateway without the additional cost and complexity associated with more security-specific or otherwise feature-rich and correspondingly more expensive network gateway devices.

Figure 4:
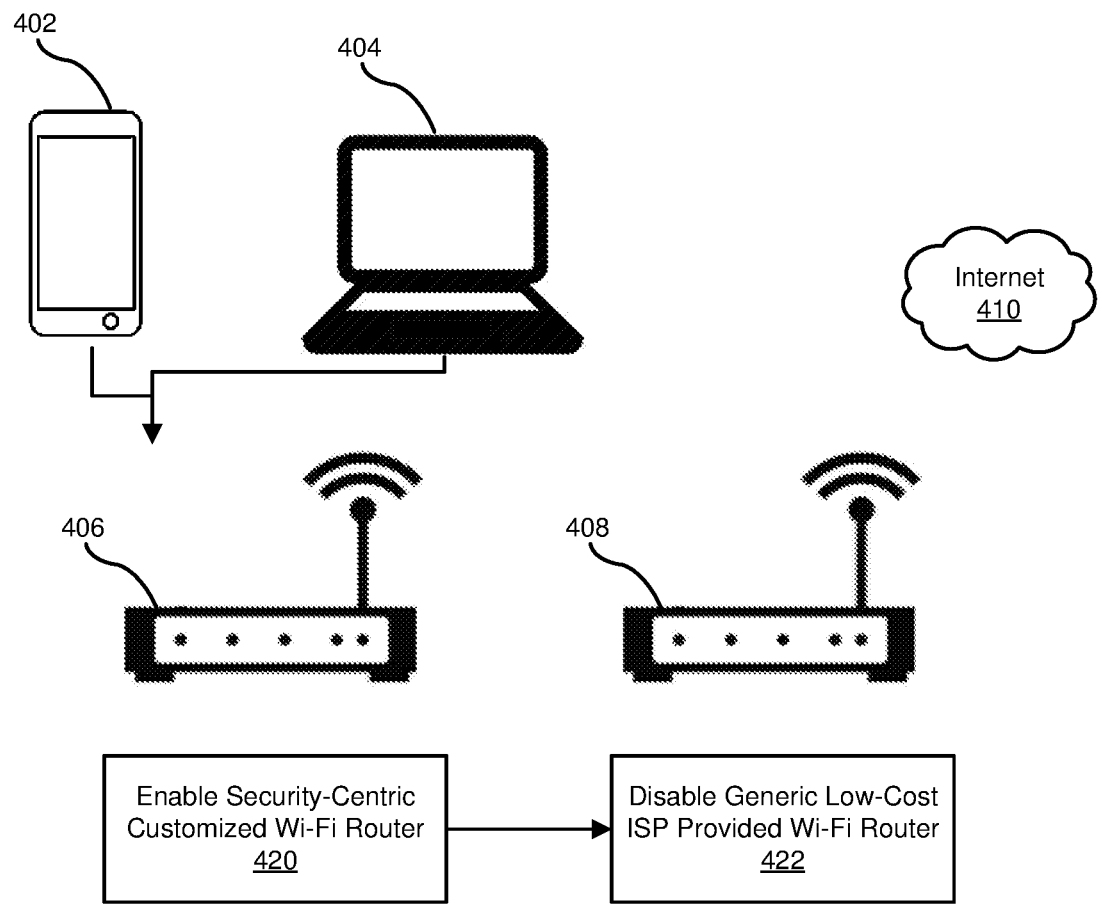
FIG. 4 is a block diagram of an example workflow relating to the method for managing devices.

By way of background, FIG. 4 illustrates an example workflow corresponding to a related or conventional system for providing comprehensive network security at the point of the home network gateway. As further shown in this figure, home users may manage endpoint user devices, such as a smart phone 402 and/or a laptop 404. Accordingly, in these examples, the home users may connect smart phone 402 and/or laptop 404 to a security-centric home network gateway 406. Security-centric home network gateway 406 may correspond to a security-centric home wireless local area network router, such as the NORTON CORE provided by SYMANTEC. Accordingly, as further shown in this figure, security-centric home network gateway 406 may provide connectivity between smart phone 402 and/or laptop 404, on the one hand, and the Internet 410, on the other hand. For this reason, a user or administrator of the network corresponding to security-centric home network gateway 406 may optionally perform a step 420, at which point the user or administrator may enable security-centric home network gateway 406. Nevertheless, this figure also further illustrates that security-centric home network gateway 406 may potentially conflict with one or more other network devices associated with the network of security-centric home network gateway 406. For example, this figure also further includes an illustration of a generic low-cost ISP-provided Wi-Fi router 408. Accordingly, to address this conflict, the user or administrator of the corresponding network may also optionally perform a step 422, at which point the user or administrator may disable generic low-cost ISP-provided Wi-Fi router 408. Of course, this potential conflict between the two network gateways may result in inconvenience and confusion on the part of a less technologically sophisticated home consumer. Accordingly, this application discloses subject matter that may improve upon this related or conventional technology, as discussed in more detail below.

Figure 2:
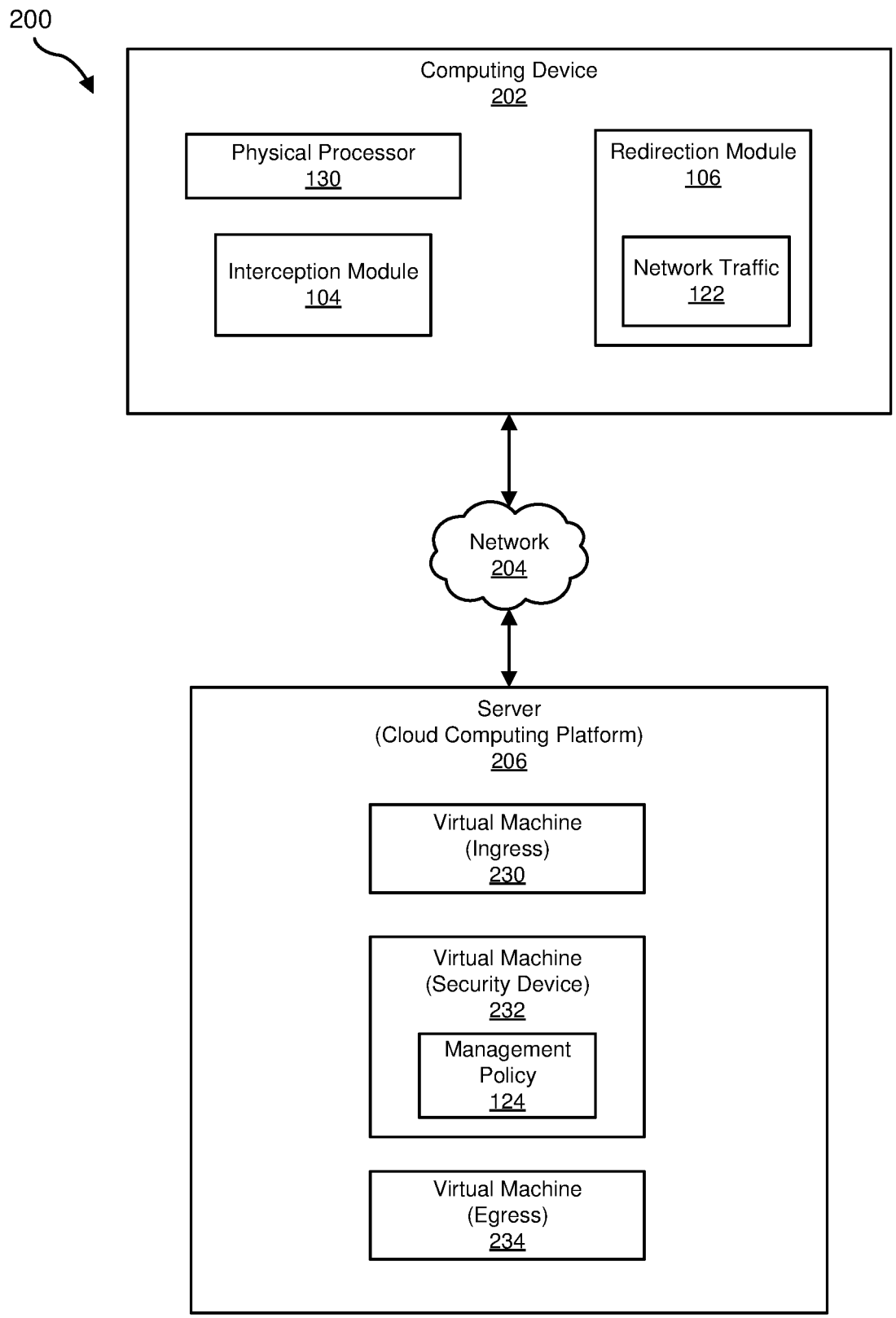
FIG. 2 is a block diagram of an additional example system for managing devices.

The following will provide, with reference to FIGS. 1-2, detailed descriptions of example systems for managing devices. Detailed descriptions of corresponding computer-implemented methods will also be provided in connection with FIGS. 3-6. In addition, detailed descriptions of an example computing system and network architecture capable of implementing one or more of the embodiments described herein will be provided in connection with FIGS. 7 and 8, respectively.

FIG. 1 is a block diagram of example system 100 for managing devices. As illustrated in this figure, example system 100 may include one or more modules 102 for performing one or more tasks. For example, and as will be explained in greater detail below, example system 100 may include an interception module 104 that intercepts outbound network traffic 122 that is directed to an original target network destination. Example system 100 may additionally include a redirection module 106 that redirects outbound network traffic 122 to a virtual computing node within a publicly available on-demand cloud computing platform for the virtual computing node to apply a management policy 124 to the outbound network traffic prior to the outbound network traffic arriving at the original target network destination. Furthermore, in these examples, a management service may direct the performance of both configuring the computing device to redirect outbound network traffic 122 to the virtual computing node within the publicly available on-demand cloud computing platform and configuring the virtual computing node within the publicly available on-demand cloud computing platform to apply management policy 124. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to manage devices.

For example, and as will be described in greater detail below, interception module 104 may intercept outbound network traffic 122 that is directed to an original target network destination. Redirection module 106 may redirect the outbound network traffic 122 to a virtual computing node, such as a virtual machine 232, within a publicly available on-demand cloud computing platform, which may correspond to server 206, for virtual machine 232 to apply management policy 124 to outbound network traffic 122 prior to outbound network traffic 122 arriving at the original target network destination. Virtual machine 232 may belong to a larger set of virtual machines, including a virtual machine 230 and a virtual machine 234, all of which are provided by the publicly available on-demand cloud computing platform, and as discussed in more detail below regarding FIGS. 5 and 6. In these examples, a management service may optionally direct the performance of configuring computing device 202 to redirect outbound network traffic 122 to virtual machine 232 within the publicly available on-demand cloud computing platform. Similarly, the management service may also direct the configuring of virtual machine 232 within the publicly available on-demand cloud computing platform to apply management policy 124.

Computing device 202 generally represents any type or form of computing device capable of reading computer-executable instructions and/or capable of performing method 300. Illustrative examples of computing device 202 may include off-the-shelf and relatively feature-thin home wireless local area network routers. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300. In one illustrative example, server 206 may correspond to a backend server of a cloud computing platform, which may provide virtual computing resources on-demand to subscribers, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
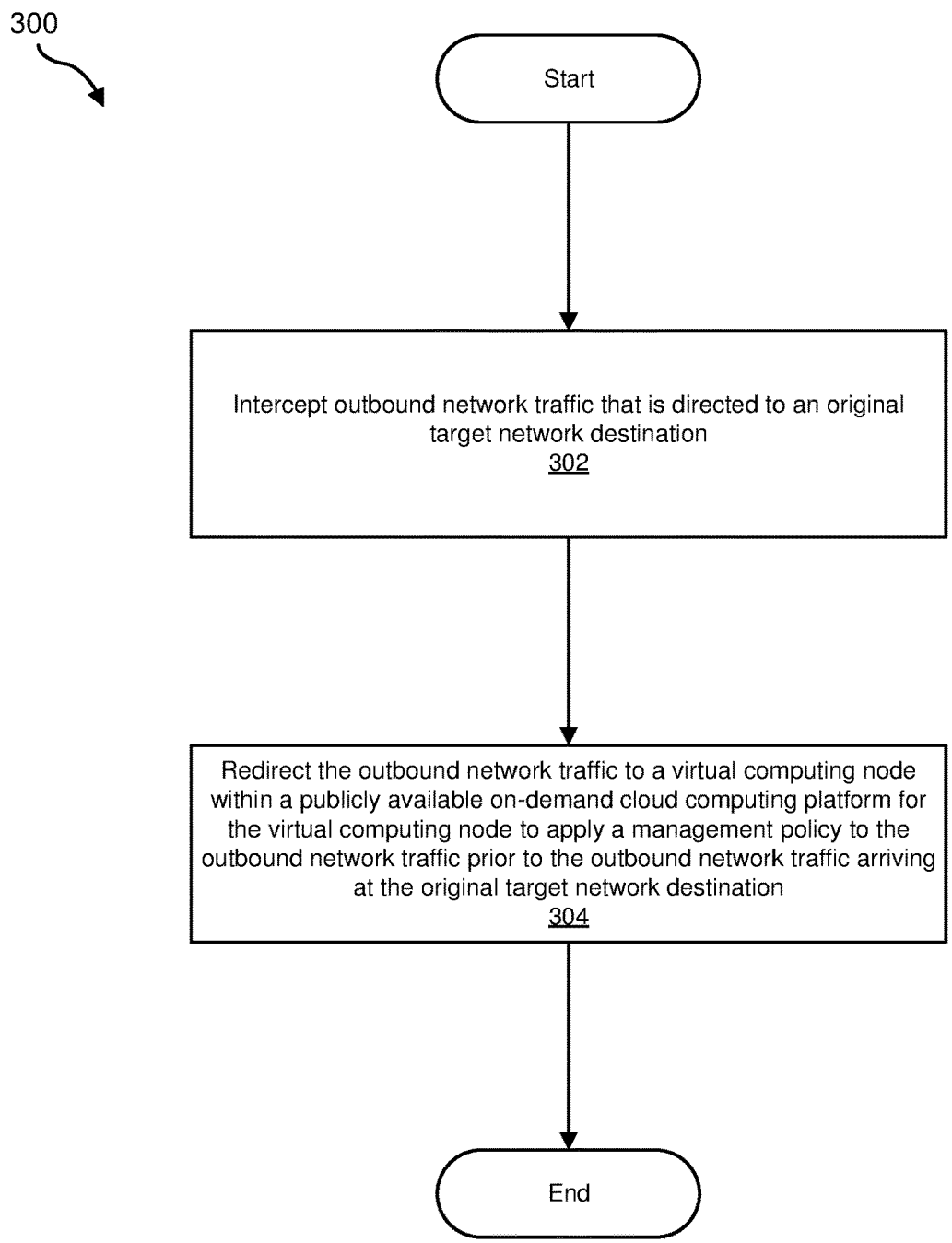
FIG. 3 is a flow diagram of an example method for managing devices.

FIG. 3 is a flow diagram of an example computer-implemented method 300 for managing devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may intercept outbound network traffic that is directed to an original target network destination. For example, interception module 104 may, as part of computing device 202 in FIG. 2, intercept outbound network traffic 122 that is directed to an original target network destination.

Interception module 104 may intercept the outbound network traffic in a variety of ways. In general, interception module 104 may intercept the outbound network traffic at least in part by receiving the outbound network traffic prior to the outbound network traffic arriving at the original target network destination. For example, interception module 104 may be disposed within a home network gateway, such as a home wireless local area network router, which may correspond to computing device 202, and interception module 104 may receive the outbound network traffic as part of a network forwarding process to forward the outbound network traffic to the original target network destination. Similarly, in some examples, interception module 104 may further retrieve standard information and/or device information to thereby further assist in selecting and applying device management policies. Rather than forwarding the outbound network traffic to the original target network destination in a conventional manner, according to conventional network routing protocols, interception module 104 may effectively intercept the outbound network traffic at least in part by signaling to redirection module 106 to redirect the outbound network traffic in accordance with step 304 of method 300, as discussed in more detail below. In additional or alternative examples, interception module 104 may optionally be disposed within a mobile device that operates a cellular network.

In alternative examples, interception module 104 may be disposed within a user endpoint computing device, such as a laptop, smart phone, or tablet, as distinct from a home network gateway. In these alternative examples, interception module 104 may intercept the outbound network traffic at the same endpoint computing device and then signal to redirection module 106 to redirect the outbound network traffic in accordance with step 304 of method 300.

At step 304, one or more of the systems described herein may redirect the outbound network traffic to a virtual computing node within a publicly available on-demand cloud computing platform for the virtual computing node to apply a management policy to the outbound network traffic prior to the outbound network traffic arriving at the original target network destination. For example, redirection module 106 may, as part of computing device 202 in FIG. 2, redirect outbound network traffic 122 to virtual machine 232 within the publicly available on-demand cloud computing platform corresponding to server 206. Redirection module 106 may redirect outbound network traffic 122 in order for virtual machine 232 to apply management policy 124 to outbound network traffic 122 prior to outbound network traffic 122 arriving at the original target network destination. Moreover, in these examples optionally a management service may direct the configuration of computing device 202 to redirect outbound network traffic 122 to virtual machine 232 within the publicly available on-demand cloud computing platform.

The management service may optionally direct the configuration of computing device 202 to redirect outbound network traffic 122 in at least one of two different manners. First, a corresponding mobile application that is coordinating with computing device 202, and/or executing on computing device 202, may communicate over network 204 with the management service. For example, the mobile application may indicate that the user or administrator at the home network has installed or enabled protections corresponding to method 300. In response, the management service (e.g., a cloud-based security service) may remotely modify computing device 202, such as a home network gateway, in the case that the home network gateway is a standardized ISP-provided off-the-shelf network gateway. The management service may perform the remote modification of computing device 202 in a manner that effectively parallels the manner in which modern Internet service providers can remotely configure standardized home network gateway devices for relatively less sophisticated customers (e.g., using IPSEC, as discussed in more detail below). Alternatively, the user or administrator may optionally follow a simple set of one or more instructions to configure manually computing device 202 within the home itself. Furthermore, in these examples optionally the same management service may also direct the configuration of virtual machine 232 within the publicly available on-demand cloud computing platform to apply management policy 124. As used herein, the term "virtual computing node" generally refers to a virtual machine or other cloud network node operating within the cloud computing platform.

Redirection module 106 may redirect the outbound network traffic in a variety of ways. In some examples, the publicly available on-demand cloud computing platform provides to subscribers mass virtual computing resources for generic computing processing. Illustrative examples of the publicly available on-demand cloud computing platform may include AMAZON AWS, MICROSOFT AZURE, GOOGLE CLOUD, ALIBABA CLOUD, and/or TENCENT CLOUD, etc. In some examples, the publicly available on-demand cloud computing platform may provide generic cloud computing functionality or processing to subscribers. The cloud computing functionality may be generic in the sense that the cloud computing platform is not limited to, or focused on, acting as a network management or security proxy, in accordance with method 300. Accordingly, the disclosed subject matter may thereby leverage the generic cloud computing functionality of the publicly available on-demand cloud computing platform such that the platform functions as a security and/or network management proxy, in accordance with method 300. By leveraging the generic cloud computing functionality of the publicly available on-demand cloud computing platform, the disclosed subject matter may thereby effectively offload one or more management or security processing steps from local execution at a home network gateway and/or user endpoint device, thereby eliminating the need for additional expense and/or hardware configuration at these devices.

Figure 5:
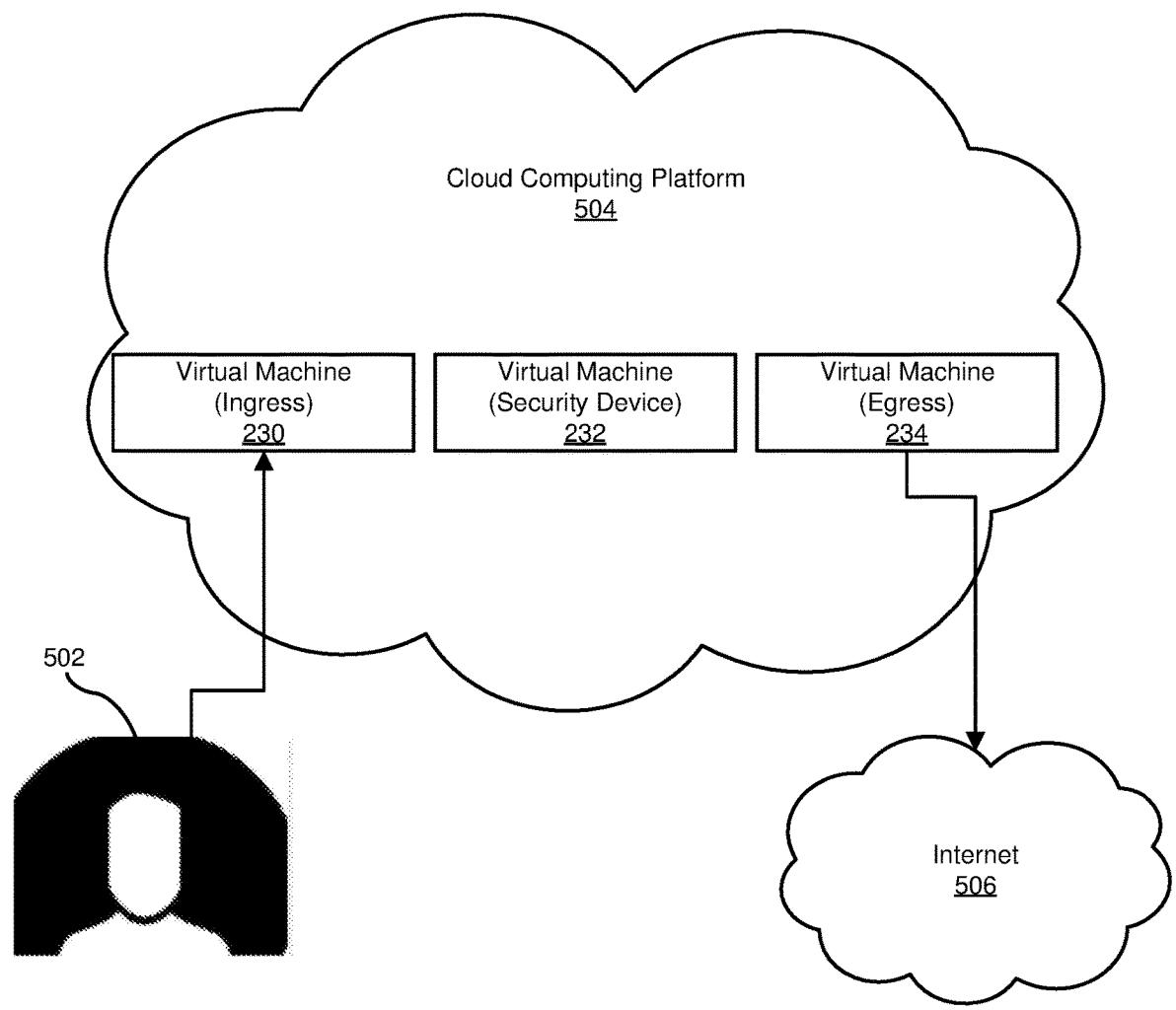
FIG. 5 is another block diagram of an example workflow relating to the method for managing devices.

FIG. 5 shows another illustration of a workflow relating to method 300. As further shown in this figure, a cloud computing platform 504 may include virtual machine 230, virtual machine 232, and virtual machine 234. This figure also further illustrates how a user 502, which may correspond to the owner or administrator of the home network, may interact with a larger wide area network, such as the Internet 506, while nevertheless enjoying the benefits of cloud computing platform 504 acting as a security and/or network management proxy to provide any one or more of the security and/or network management proxy benefits that are further discussed above. Accordingly, user 502 may originally generate outbound network traffic, such as network traffic 122, which is directed to an original target network destination on the broader public Internet 506. After transmitting one or more network packets according to this originally generated outbound network traffic, a previously configured computing device, such as computing device 202, may intercept the outbound network traffic (e.g., using interception module 104) and then redirect the intercepted outbound network traffic to cloud computing platform 504 (e.g., using redirection module 106). For example, redirection module 106 may optionally redirect the outbound network traffic to virtual machine 230, which may correspond to an edge router within cloud computing platform 504, and which may further function as an ingress virtual machine to newly accept and accordingly route incoming network traffic. Virtual machine 230, which may function as the ingress virtual machine, may thereby further redirect the outbound network traffic to one or more security devices, such as virtual machine 232. Virtual machine 232 may optionally function as a management security device, which may further direct the inbound network traffic through a series of multiple additional security devices, as discussed in more detail below regarding FIG. 6. After completing the above-describe processing through one or more security devices, including virtual machine 232, cloud computing platform 504 may optionally route the inbound network traffic to virtual machine 234, which may effectively function as an egress virtual machine and corresponding edge router. Accordingly, virtual machine 234 may optionally deliver the processed and/or managed inbound network traffic onward to the original target network destination within the broader wide area network such as Internet 506.

Moreover, cloud computing platform 504 may also optionally receive additional network traffic from the broader wide area network that is responsive to the outbound network traffic. Accordingly, in these additional examples, cloud computing platform 504 may effectively operate in the opposite direction to apply one or more security and/or network management policies to inbound network traffic, as distinct from outbound network traffic, and thereafter further provide the processed inbound network traffic back to original user 502.

Figure 6:
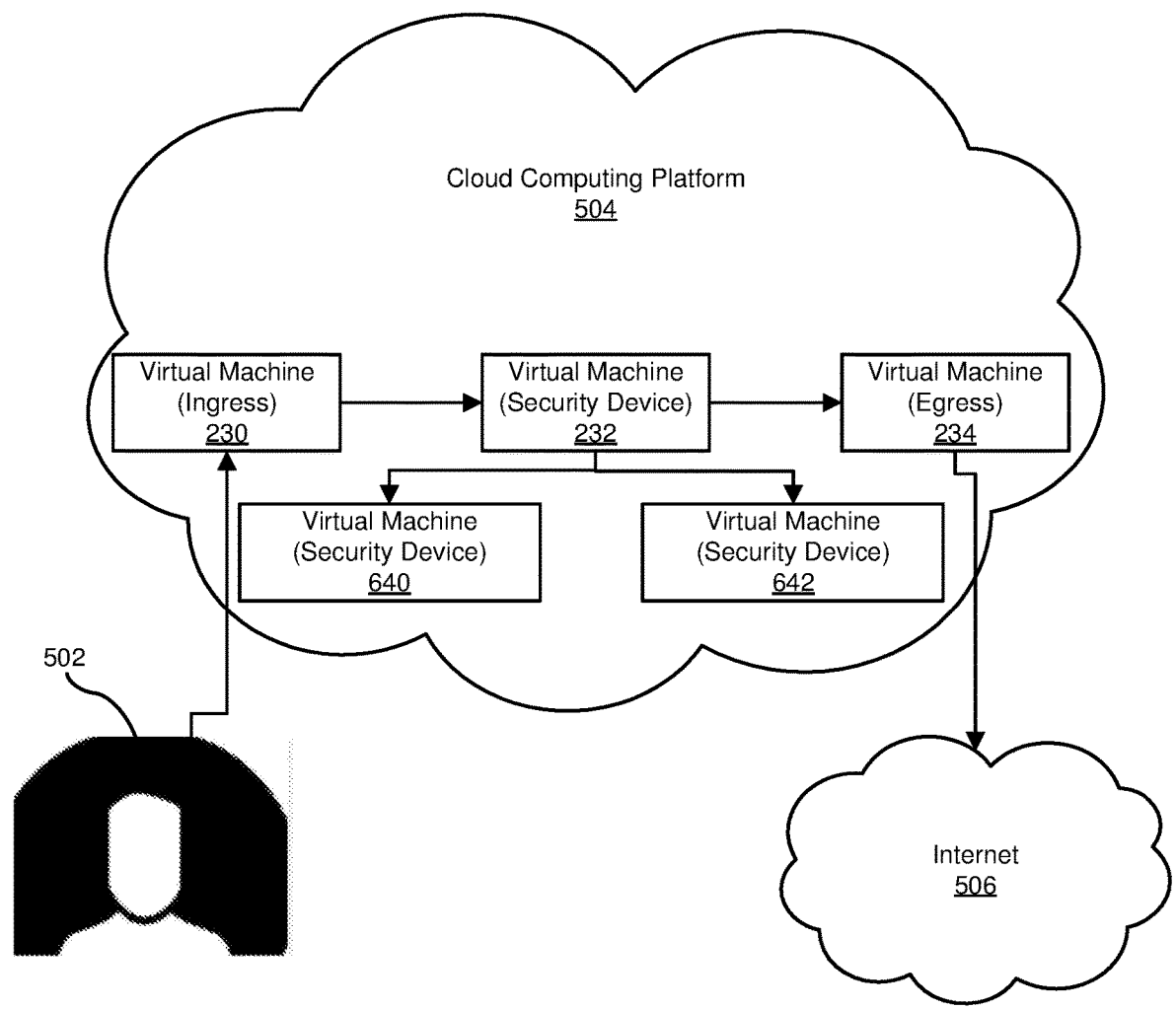
FIG. 6 is another block diagram of an example workflow relating to the method for managing devices.

Additionally, FIG. 6 provides another illustration of a workflow corresponding to method 300. The example of FIG. 6 elaborates on the example of FIG. 5 by further illustrating how virtual machine 232, which may be operating effectively as a security device within cloud computing platform 604, may further redirect and/or reroute one or more items of inbound network traffic to one or more additional security devices, which may be executing in the form of virtual machine or nodes within cloud computing platform 604. For example, virtual machine 232, which may be operating as an overall management security device, may first redirect inbound network traffic to a virtual machine 640, which may also be operating as a security device that applies a specialized predefined security policy to the inbound network traffic. After processing at virtual machine 640, virtual machine 640 may return the processed inbound network traffic back to virtual machine 232, which again may be operating as the overall management security device. Accordingly, after receiving the inbound network traffic that was previously processed by virtual machine 640, virtual machine 232 may further reroute the inbound network traffic to an additional virtual machine, in this case a virtual machine 642, which may apply an additional and distinct specialized predefined security policy, or other network management policy, to the inbound network traffic. After successful processing of the inbound network traffic at virtual machine 642, virtual machine 642 may return the processed inbound network traffic to virtual machine 232. Accordingly, virtual machine 232, which may be acting effectively as the overall management security device, may effectively reroute the inbound network traffic through a series of one or more security devices, where each security device corresponds to one or more virtual machines executing within cloud computing platform 604, thereby processing the inbound network traffic in sequence, such that user 502 effectively benefits from a series of applications of different and distinct specialized security and/or network management policies. After the effect of funneling the inbound network traffic through the entire sequence of security devices, virtual machine 232 may subsequently route and/or direct the processed network traffic to virtual machine 234, which may be operating as an egress virtual machine and/or corresponding edge router within cloud computing platform 604. Moreover, in some examples, a user account protected by the management policy may apply the management policy in real-time.

In one embodiment, the management service is distinct and independent from the publicly available on-demand cloud computing platform. For example, the management service may optionally be provided by a third-party security vendor, such as SYMANTEC. In these examples, the third-party security vendor, or other network management services vendor, may be effectively distinct and/or independent (e.g., legally distinct or independently controlled) from the publicly available on-demand cloud computing platform. As one illustrative example, a third-party security vendor, such as MCAFEE, may be both distinct and independent, functionally and legally, from prominent examples of publicly available on-demand cloud computing platforms, such as those listed above including AMAZON AWS, MICROSOFT AZURE, GOOGLE CLOUD, ALIBABA CLOUD, and/or TENCENT CLOUD. In these examples, although the third-party security vendor, such as SYMANTEC, may have a focus on security and/or network management proxy functionality, the distinct and independent larger publicly available on-demand cloud computing platforms may not necessarily have this relatively narrower focus. Accordingly, the third-party security vendor may effectively leverage the generic virtual computing processing power of the on-demand cloud computing platform to function as the security and/or network management proxy. By utilizing the on-demand cloud computing platform, the third-party security vendor may thereby eliminate a need for the third-party security vendor to provide specialized and/or customized security and/or network management functionality and corresponding specialized hardware at the home network gateway, which may correspond to computing device 202.

More specifically, in some examples, the network gateway substantially lacks security-specialized application processing, as distinct from generic network traffic routing processing, other than redirecting the outbound network traffic, such that the network gateway substantially offloads security-specialized application processing onto the virtual computing node within the publicly available on-demand cloud computing platform without performing the security-specialized application processing locally at the network gateway. In other words, in some examples computing device 202 may correspond to a standard and low-level off the shelf home network gateway, such as home network gateways provided by Internet service providers and/or other wide area network service providers, as distinct from customized and/or security-specialized home wireless network gateways, such as the NORTON CORE that is provided by SYMANTEC. Accordingly, in these illustrative examples, computing device 202 may correspond to a standard and low-level off the shelf home network gateway, such as a relatively inexpensive home network gateway that is provided by an Internet service provider, and in these examples computing device 202 may nevertheless still provide an additional layer of feature-rich security and/or network management protections and policies, such as those that were traditionally provided by relatively more expensive specialized and customized home network gateways, such as the NORTON CORE, yet without involving the additional hardware, customization, and/or expense associated with customized home network gateways. Instead, as further outlined above, the disclosed subject matter may effectively offload one or more features of the additional layer of feature-rich security and/or network management protections and policies that may otherwise be provided by these specialized and customized home network gateways onto the publicly available on-demand cloud computing platform.

In one embodiment, management policy 124 may include a security policy. For example, the security policy may optionally be directed to at least one of: (i) network traffic inspection and scanning, (ii) media content filtering, (iii) application identification and threat analysis, (iv) data loss prevention, (v) command-and-control malware detection, (vi) botnet participation detection, and/or (vii) parental control. Additionally, or alternatively, in one embodiment the management policy may be directed to at least one of: (i) quality of service management, (2) network traffic rate control, (iii) application traffic prioritization, (iv) network traffic pausing functionality, and/or (v) problem network traffic probing and detection. Moreover, in these examples, the security policy may be further configured to issue a real-time notification regarding a network security threat to a user account protected by the security policy through at least one of an intra-application notification, a text message notification, or a telephone notification.

In some illustrative examples, redirection module 106 may effectively operate in a bidirectional manner. Accordingly, redirection module 106 and/or interception module 104, in coordination with each other, may effectively operate to provide security and/or network management proxy functionality, in accordance with method 300, to both outbound network traffic, such as network traffic 122, and also to inbound network traffic. In some examples, the inbound network traffic may be responsive to outbound network traffic 122. In particular, in some illustrative examples, method 300 may further include (i) receiving inbound network traffic from the publicly available on-demand cloud computing platform that is responsive to the intercepted outbound network traffic and (ii) forwarding the inbound network traffic to a user device, which optionally may be connected to computing device 202, that generated the outbound network traffic such that the publicly available on-demand cloud computing platform acts as an intermediary to apply the management policy. Moreover, in these examples, a traffic path through the publicly available on-demand cloud computing platform may be fully controlled such that traffic flows symmetrically in both directions for original outbound network traffic and inbound network traffic that is responsive to the outbound network traffic.

The above discussion provides a generalized overview of the disclosed subject matter relating to method 300 of FIG. 3. Additionally, the following discussion provides an overview of additional and/or alternative concrete embodiments of the disclosed subject matter.

The disclosed subject matter may include non-intrusive methods for connecting standard-issued Internet service provider Wi-Fi routers to a cloud-based security service. In these examples, the standard-issued Internet service provider Wi-Fi routers may operate effectively using original or factory-set firmware without any additional modifications or customizations to achieve the security and/or network management features of the disclosed subject matter. In other words, the customization and/or modifications made to the standard-issued Internet service provider Wi-Fi routers may in some cases be limited to effectively toggling a redirection feature to redirect certain instances of network traffic to a publicly available on-demand cloud computing platform, where the more comprehensive and feature-rich set of security and/or network management features may be performed, thereby effectively offloading the performance of this functionality from local performance at the Wi-Fi router.

In some examples, the disclosed subject matter may achieve the above-describe benefits through the creation of a controlled overlay network, which may be created using standard publicly available on-demand cloud computing platform components in order to process household network traffic. In further examples, the egress/ingress path within the cloud computing platform may be dictated by a controlling component of the disclosed subject matter such that no network traffic can escape policy-based control.

In some examples, the disclosed subject matter may perform traffic classification and/or content inspection. Additionally, or alternatively, other services such as parental control, wide area network "pausing" functionality, and/or network threat analysis may be provided. Furthermore, in some examples information about attached Internet-of-things devices may be collected and/or profiled. Accordingly, in these examples device-specific policies can be enforced.

In some examples, a cloud-attached mobile application controls the service configuration and thereby acts as a monitoring station for the provided services, such as those services that are listed above. The mobile application may optionally display information that indicates or identifies the currently active users, the actively attached devices, the executing applications, the types of network traffic that are coming from these devices, the active policies that are acting on these users/devices, etc. The cloud-service may optionally generate active alerts into the mobile application over both a wireless local area network (e.g., Wi-Fi) and/or cellular (e.g., LTE) network connection, and in some scenarios may select whichever one of these two network connections is currently active. Accordingly, the policy management functionality of the disclosed subject matter may be provided globally regardless of which corresponding cloud computing platform is available (e.g., AMAZON AWS). Other illustrative examples of the publicly available on-demand cloud computing platform may include MICROSOFT AZURE, GOOGLE CLOUD, ALIBABA CLOUD, and/or TENCENT CLOUD.

One significant challenge associated with related and/or conventional technologies is that a device that is not connected to a customized security Wi-Fi router, such as the NORTON CORE, will not be protected at all. For example, a smart phone that is connected to the Wi-Fi router at home is protected, but the protection is missing when the user takes the smart phone to the shopping mall. The lack of security in this scenario is due to the fact that the user is mobile and not located at the corresponding home location, whereas the smart phone is connected using the cellular network connection, and there is no security software installed on the smart phone. Additionally, or alternatively, in some examples the smart phone, and/or other mobile endpoint user device such as a laptop or tablet, can implement one or both of interception module 104 and/or redirection module 106, using built-in software components, to connect to the cloud service.

In view of the above, one first significant novelty of the disclosed subject matter is to leverage standard-issue and/or limited functionality (e.g., "thin") home network gateway devices, such as an existing router that was purchased by customer and is already installed at the home location, and subsequently link this existing Wi-Fi router into a cloud-based security service to gain access to a rich set of security and network management features. In this scenario, the service may be uniform in the sense that the service is accessible through the Wi-Fi router and/or is accessible when the device is effectively operating on its own running over the cellular network. The security service is accessible globally in just about any country, with the same set of policies.

One insight relating to the disclosed subject matter herein is the idea of pulling one or more items of information about a connected device from the standard-issue Wi-Fi router. One helpful piece of information to retrieve is a list of which devices are connected to the Wi-Fi router. A customized security Wi-Fi router, such as NORTON CORE, can use a captive portal approach to force users to enter information describing the users and/or the corresponding devices. The customized software on the security-centric Wi-Fi router may then optionally send these items of information to a control application to set and apply corresponding security policies. In contrast, for a standard off-the-shelf Wi-Fi router, from either an Internet service provider and/or purchased from an e-commerce retailer online, the inventive insight herein is the idea to audit existing operating system logs and/or runtime configuration files to discover which devices correspond to this home network (e.g., through information correlation and/or pattern recognition). The assigned Internet protocol addresses for connected devices are one helpful item of information to obtain. At the lowest level of code implementation, the Internet protocol address may optionally be used as the device identification and also may be used to apply security policies for that device.

Additionally, or alternatively, DHCP server address assignment mapping information may be kept inside the system (e.g., the router). This mapping table may optionally contain the device name (which may be formatted in a human readable string and/or partial ASCII string), the media access control address, and/or the corresponding assigned Internet protocol address. The manufacture identifier can also optionally be harvested from the media access control address, which can further indicate a type of the connected device. The device name, for example, is typically used to identify the user. For an Internet-of-things device, the manufacturer will in some cases put in a default string for the device. These pieces of information can be harvested together to allow the homeowner to identify which Internet-of-things device, or other connected device, is currently connected to the corresponding Wi-Fi router.

Subsequently, one or more of these items of device/user information may be transmitted to a cloud computing platform. Since the Wi-Fi router may optionally be built on top of a LINUX system, the router may also already include an SSH server component and a corresponding administrator user account. Therefore, in these examples the Wi-Fi router may simply enable the SSH server so that the service connecting to the cloud computing platform may connect through the SSH port, and furthermore this connection may be established using an agreed-upon user account (e.g., on the Wi-Fi router) to thereby pull system logs and runtime tables. The system logs and runtime tables may optionally be "read only" for non-administrator users. In this scenario, there may be no effective risk of a security issue. The approach outlined above may be novel in the sense that although the devices are physically situated multiple network segments away from the cloud service, the cloud service can nevertheless identify the device type of each device using the collected information and subsequently use the Internet protocol address to identify the device and thereafter apply one or more security and/or network management policies.

The disclosed subject matter may also include the following point of novelty. In some scenarios the Wi-Fi router may be built with IPSEC functionality within the LINUX operating system. Additionally, or alternatively, the Wi-Fi router may be built with any additional, corresponding, and/or analogous secure network protocol functionality, as distinct from IPSEC specifically. In view of this available functionality, the cloud service may configure the IPSEC component (or analogous secure network protocol component) to connect to the cloud service access point, such as a public Internet protocol address that is provided by the cloud service. For a network gateway that is managed by a corresponding Internet service provider, these secure network protocol configuration settings can be remotely provisioned by the Internet service provider (e.g., AT&T can remotely provision the settings into its Wi-Fi router using a late night firmware, disk image, and/or other update, and this can be performed in a manner parallel to how the Internet service provider typically updates the firmware and/or other configuration on the customer's router).

In view of the above, individual devices that are moving from location to location dynamically can also use built-in IPSEC (or other analogous secure network protocol components) to access the cloud-based security and/or network management services through the same and/or different accessible network point. Regardless of which network access point is used, the security and/or network management policies may follow the mobile device and/or corresponding user as soon as the device connects and its identification is confirmed through one or more authentication procedures. The solution outlined above thereby enables the enforcement of various policies to be consistent for a specific device, regardless of whether the device is connected through a wireless local area network, such as a Wi-Fi network, or through an alternative cellular network (e.g., 4G/LTE). Moreover, in these scenarios, the enforcement of the policies may be consistent across the entire world.

The disclosed subject matter may also include an additional point of novelty described as follows. This additional point of novelty may include the ability to design and construct a service infrastructure network on top of a public cloud, such as AMAZON AWS, MICROSOFT AZURE, ALIBABA CLOUD, etc. A basic computing system in the public cloud, such as AWS, may provide a virtual machine executing on a specific operating system, such as WINDOWS and/or LINUX. In some scenarios each virtual machine may have a different set of hardware configurations, which may include a number of different central processing unit cores, an amount of random access memory and/or disk storage, etc. In general, any suitable customer may rent one or more of these virtual machines from a publicly available on demand cloud computing platform. These publicly available cloud platforms do not necessarily provide for customization. Accordingly, one difficulty relates to connecting different virtual machines to build an overlay network infrastructure, on top of which may be provided security and/or network management proxy functionality. Traditional cloud computing platforms, such as AMAZON AWS, may offer minimum connectivity for each virtual machine. Even in the case of AWS, a virtual private cloud may not enable additional flexibility. Accordingly, as a practical matter in the modern marketplace a third-party security vendor such as SYMANTEC may potentially be limited to building a custom cloud service by partnering with the large corporate owner of the cloud computing platform, such as AMAZON, and thereby coordinating with AMAZON to build a "customized" private cloud so that the third-party security vendor can have the flexibility to design its own complex service network on top of it. This scenario outlined above is costly, not scalable, time-consuming, and difficult to migrate from one cloud computing platform to another alternative cloud computing platform, such as MICROSOFT or ALIBABA.

Additionally, in the scenario outlined above, for a security device to function properly, the traffic flows that are transmitted to the device should be rendered consistently in both a forward direction and a reverse direction. In other words, for the security device to function correctly "asymmetric routing" should not occur. In view of the above, in some embodiments, the overlay service network should have the ability to fully control the traffic flow path within the public cloud for each virtual machine that is part of the overlay network.

In view of the above, in one embodiment of the disclosed subject matter, three virtual machines are used to build the core path within the cloud service. Each virtual machine may optionally contain at least one pair of network interfaces. Two virtual machines may optionally execute as edge routers (e.g., virtual machine 230 and virtual machine 234) and one virtual machine may optionally execute as an in-line security device (e.g., virtual machine 232). Various features of the edge router can be built using standard LINUX components that are readily available within a default computing virtual machine. Additionally, the in-line virtual machine may optionally execute customized security and/or network management software. Through standard routing configuration procedures using specific routing entries, the corresponding network traffic can be directed from one router to the next router. The in-line virtual machine performs at least a simple bridge function to successfully complete the overall network flow (e.g., traffic received at one interface is transmitted onto the other interface, and vice versa, as further shown in FIGS. 5 and 6).

Returning to the example of FIG. 5, for all traffic going to the destinations to the right on the Internet (e.g., traffic going from left to right in the diagram), virtual machine 232 is the next-hop router for virtual machine 230. Virtual machine 232 performs bridging from the left interface onto the right interface. Virtual machine 234 is the next-hop router for virtual machine 232. For the return traffic to all of the destinations on the left (e.g., traffic going from right to left in the diagram), virtual machine 232 is the next-hop router for virtual machine 234. Virtual machine 232 performs bridging from the right interface to the left interface. Similarly, virtual machine 230 is the next-hop router for virtual machine 232.

In addition to the point of novelty outlined above, the disclosed subject matter may also relate to an additional point of novelty further discussed as follows. This third novelty may include inserting additional services without restructuring the network of the cloud computing platform. In these examples, each virtual machine may optionally contain a number of interfaces. For the in-line virtual machine, it can also include additional interfaces, such as one for connecting to a security device that offers a specific security service. Two virtual local area networks can be configured on each interface, essentially converting that "physical" interface into two "virtual" interfaces. Configuring these virtual local area networks will allow the in-line virtual machine to hand off a transaction to one or more additional security devices that can apply further security processing, as shown in FIG. 6. Using the virtual local area networks traffic redirection methods, such as policy-based routing ("PBR") and WCCP, the corresponding network traffic may be effectively redirected, by the in-line virtual machine, to one or more additional security devices that each provides a specific security service, as further illustrated in FIG. 6.

Returning to the example of FIG. 5, the overall system may control the entire traffic flow in both directions, through the cloud, while offering a series of security services, and/or network management services, using essentially three virtual machines as the main "backbone." As can be seen in these figures, using a standard cloud computing platform and corresponding virtual machines, the disclosed subject matter may allow one or more administrators to leverage existing cloud computing platform tools and scripts to easily construct any type of cloud-based services, including security and network management proxy services, as further discussed above, and thereby configure the network components quickly and successfully make the entire network operational within a relatively short timeframe.

To summarize the above discussion, a related system, such as the SYMANTEC WEB SECURITY SERVICES CLOUD, may involve customize design, by SYMANTEC, and this related system may be accessed through a SYMANTEC-provided specific service access point ("SAP"). In contrast, the disclosed subject matter, instead of creating a customized complex service network infrastructure designed on a private cloud computing environment, may effectively build the cloud-based solution on a publicly available on demand cloud computing platform, such as the AMAZON AWS cloud environment, thereby making the security and network management proxy services relatively easier to set up and take-down, transform, move, and/or re-create either on AWS or any other comparable or analogous publicly available on demand cloud computing environment, as further listed above. The disclosed subject matter may thereby allow the use of standardized and publicly available cloud computing platform operation tools, and standardized cloud resources, such as non-customized virtual machines. Moreover, the use of standardized virtual machines, without any additional customization, thereby leads to a self-contained solution to control the traffic flow path into the cloud, out of the cloud onto the Internet, and then returning from the Internet, with the return path being guaranteed to be the same in a symmetrical manner.

Additionally, the disclosed subject matter may also relate to an additional point of novelty as discussed below. This additional point of novelty may include a notification mechanism that notifies a user or administrator through a mobile device (e.g., a mobile device application notification, an SMS message, a phone call, etc.). These notifications may alert the user or administrator about dynamically discovered potential issues, threats discovered in real-time (e.g., the home network is under attack), and/or provide the user with the ability to view information regarding these issues and subsequently apply corresponding security or other responsive policies in real-time.

In addition to the above, one potentially unique aspect of the notification component may include the mobile application itself. Instead of connecting to a central server to pull user/device data, the application may optionally connect directly to the service port, as further described above. In this way, there may be in some scenarios no additional data copying/moving from a service virtual machine to a central server, so it is more efficient and timely for real-time notification. Secondly, since the mobile application connects directly to the service virtual machine, there is little chance of data leaking among different customers, and less of a chance to hack other customers. This data retrieval service port may optionally be different than the service port itself, whereas the Internet protocol address may optionally be the same, and the service port is "read-only." In view of the above, the mobile application notification may in some scenarios always work because it does not connect to a well-known server Internet protocol address that can be tracked, analyzed, and blocked when inside of a specific country.

The disclosed subject matter may also relate to an additional point of novelty as further described in the following. This additional point of novelty may include the strategic place of the in-line virtual machine, using the core three-virtual-machine path outlined above regarding FIGS. 5 and 6, which may enable the in-line virtual machine to provide a rich set of security and network services that potentially as good as those provided by physical security-centric appliances in localized on-premise deployments such as the NORTON CORE. Even more importantly, in some scenarios the services can be constructed and provided on any public cloud platform such as AMAZON AWS, GOOGLE CLOUD, MICROSOFT AZURE, and ALIBABA CLOUD, as further described above.

Figure 7:
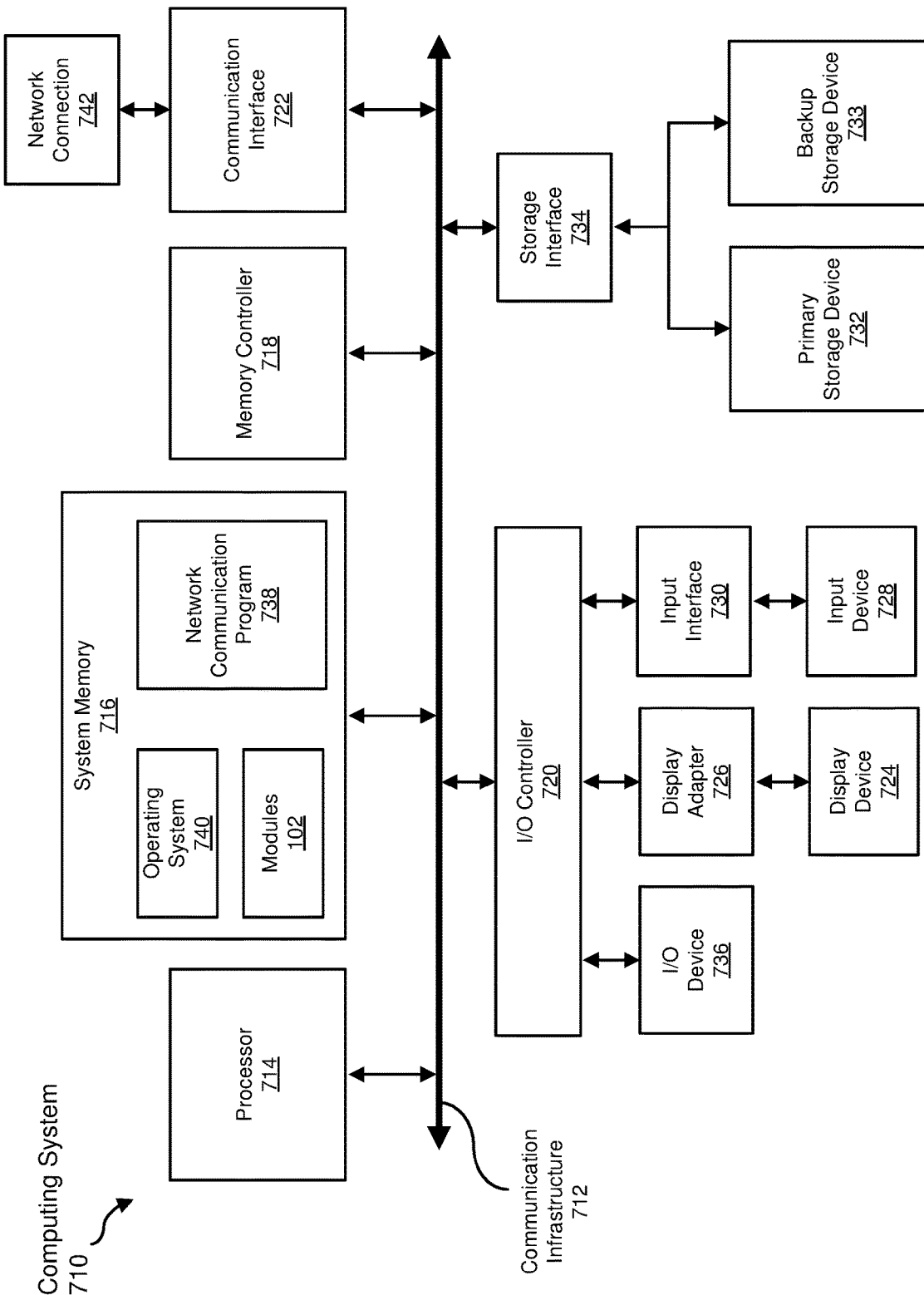
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O)

controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
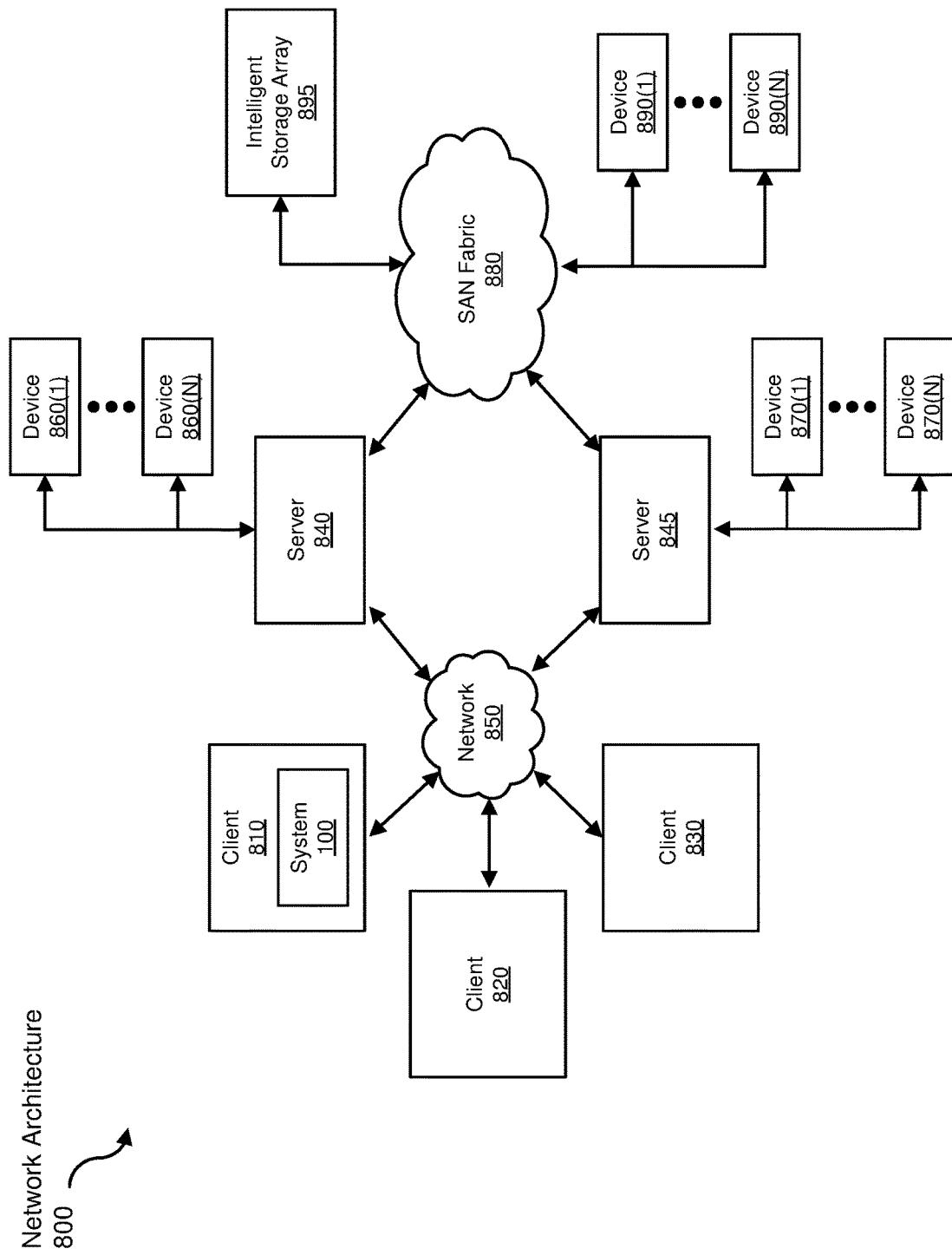
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(i)-(N) may be directly attached to server 845. Storage devices 860(i)-(N) and storage devices 870(i)-(N) generally represent any type or form of storage device or medium capable of storing data and/or other computer-readable instructions. In certain embodiments, storage devices 860(i)-(N) and storage devices 870(i)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(i)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(i)-(N) and array 895 appear as locally attached devices to client systems 810, 820, and 830. As with storage devices 860(1)-(N) and storage devices 870(i)-(N), storage devices 890(i)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(i)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(i)-(N), storage devices 870(i)-(N), storage devices 890(i)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for managing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing devices, at least a portion of the method being performed by a computing device comprising at least one processor, the method comprising:
    intercepting, at an ingress virtual computing machine of an overlay service network within a public cloud of a publicly available on-demand cloud computing platform, outbound network traffic that is directed to an original target network destination; and
    redirecting the outbound network traffic to a second virtual computing machine within the publicly available on-demand cloud computing platform for the second virtual computing machine to apply a management policy to the outbound network traffic prior to the outbound network traffic arriving at the original target network destination;
    wherein:
    a management service directs the performance of:
    configuring the ingress virtual computing machine to redirect the outbound network traffic to the second virtual computing machine within the publicly available on-demand cloud computing platform;
    configuring the second virtual computing machine within the publicly available on-demand cloud computing platform to apply the management policy; and
    configuring the second virtual computing machine to redirect the outbound network traffic to an egress virtual computing machine within the publicly available on-demand cloud computing platform;
    application of the management policy is enabled through creation of the overlay service network within the publicly available on-demand cloud computing platform such that the outbound network traffic is prevented from escaping policy-based control; and
    the overlay service network controls a traffic flow path within the public cloud for each of a set of virtual machines that is part of the overlay service network.

2. The computer-implemented method of claim 1, wherein the management policy comprises a security policy.

3. The computer-implemented method of claim 1, wherein the computing device comprises a network gateway.

4. The computer-implemented method of claim 1, wherein the publicly available on-demand cloud computing platform provides to subscribers mass virtual computing resources for generic computing processing.

5. The computer-implemented method of claim 1, wherein the management service is distinct and independent from the publicly available on-demand cloud computing platform.

6. The computer-implemented method of claim 1, wherein the management policy is directed to at least one of:
    quality of service management;
    network traffic rate control;
    application traffic prioritization;
    network traffic pausing functionality; or
    problem network traffic probing and detection.

7. The computer-implemented method of claim 1, further comprising:
    receiving inbound network traffic from the publicly available on-demand cloud computing platform that is responsive to the intercepted outbound network traffic; and
    forwarding the inbound network traffic to a user device that generated the outbound network traffic such that the publicly available on-demand cloud computing platform acts as an intermediary to apply the management policy.

8. The computer-implemented method of claim 1, wherein the computing device comprises a mobile device that operates on a cellular network.

9. The computer-implemented method of claim 1, wherein the respective traffic flow path through the publicly available on-demand cloud computing platform is fully controlled such that traffic flows symmetrically in both directions.

10. The computer-implemented method of claim 1, wherein:
    the management policy comprises a security policy;
    the security policy is configured to detect at least one network security threat; and
    the security policy is further configured to issue a real-time notification regarding the network security threat to a user account protected by the security policy through at least one of an intra-application notification, a text message notification, or a telephone notification.

11. The computer-implemented method of claim 1, wherein a user account protected by the management policy may apply the management policy in real-time.

12. The computer-implemented method of claim 2, wherein the security policy is directed to at least one of:
    network traffic inspection and scanning;
    media content filtering;
    application identification and threat analysis;
    data loss prevention;
    command-and-control malware detection;
    botnet participation detection; or
    parental control.

13. The computer-implemented method of claim 3, wherein the network gateway comprises a home wireless local area network router.

14. The computer-implemented method of claim 3, wherein the network gateway substantially lacks security-specialized application processing, as distinct from generic network traffic routing processing, other than redirecting the outbound network traffic, such that the network gateway substantially offloads security-specialized application processing onto the second virtual computing machine within the publicly available on-demand cloud computing platform without performing the security-specialized application processing locally at the network gateway.

15. A system for managing devices, the system comprising:
an interception module, stored in memory of a computing device, that intercepts, at an ingress virtual computing machine of an overlay service network within a public cloud of a publicly available on-demand cloud computing platform, outbound network traffic that is directed to an original target network destination; and
a redirection module, stored in memory of the computing device, that redirects the outbound network traffic to a second virtual computing machine within the publicly available on-demand cloud computing platform for the second virtual computing machine to apply a management policy to the outbound network traffic prior to the outbound network traffic arriving at the original target network destination;
wherein:
a management service directs the performance of:
configuring the ingress virtual computing machine to redirect the outbound network traffic to the second virtual computing machine within the publicly available on-demand cloud computing platform;
configuring the second virtual computing machine within the publicly available on-demand cloud computing platform to apply the management policy; and
configuring the second virtual computing machine to redirect the outbound network traffic to an egress virtual computing machine within the publicly available on-demand cloud computing platform;
application of the management policy is enabled through creation of the overlay service network within the publicly available on-demand cloud computing platform such that the outbound network traffic is prevented from escaping policy-based control;
the overlay service network controls a traffic flow path within the public cloud for each of a set of virtual machines that is part of the overlay service network; and
at least one physical processor configured to execute the interception module and the redirection module.

16. The system of claim 15, wherein the publicly available on-demand cloud computing platform provides to subscribers mass virtual computing resources for generic computing processing.

17. The system of claim 15, wherein the management service is distinct and independent from the publicly available on-demand cloud computing platform.

18. The system of claim 15, wherein the computing device comprises a network gateway.

19. The system of claim 18, wherein the network gateway comprises a home wireless local area network router.

20. A non-transitory computer-readable medium comprising one or more computer-readable instructions that, when executed by at least one processor of a computing device, cause the computing device to:
intercept, at an ingress virtual computing machine of an overlay service network within a public cloud of a publicly available on-demand cloud computing platform, outbound network traffic that is directed to an original target network destination; and
redirect the outbound network traffic to a second virtual computing machine within the publicly available on-demand cloud computing platform for the second virtual computing machine to apply a management policy to the outbound network traffic prior to the outbound network traffic arriving at the original target network destination;
wherein:
a management service directs the performance of both:
configuring the ingress virtual computing machine to redirect the outbound network traffic to the second virtual computing machine within the publicly available on-demand cloud computing platform;
configuring the second virtual computing machine within the publicly available on-demand cloud computing platform to apply the management policy; and
configuring the second virtual computing machine to redirect the outbound network traffic to an egress virtual computing machine within the publicly available on-demand cloud computing platform;
application of the management policy is enabled through creation of the overlay service network within the publicly available on-demand cloud computing platform such that the outbound network traffic is prevented from escaping policy-based control; and
the overlay service network controls a traffic flow path within the public cloud for each of a set of virtual machines that is part of the overlay service network.

* * * * *